DIGITAL DATA STORAGE AND TRANSFER CIRCUITRY

Original Filed Jan. 15, 1960

INVENTOR.
ROY W. REACH, JR.
BY [signature]
ATTORNEY

United States Patent Office 3,369,226
Patented Feb. 13, 1968

3,369,226
DIGITAL DATA STORAGE AND TRANSFER CIRCUITRY

Roy W. Reach, Jr., Sudbury, Mass., assignor to Honeywell Inc., a corporation of Delaware
Continuation of application Ser. No. 2,700, Jan. 15, 1960. This application May 12, 1964, Ser. No. 366,876
3 Claims. (Cl. 340—174)

Figure 1:
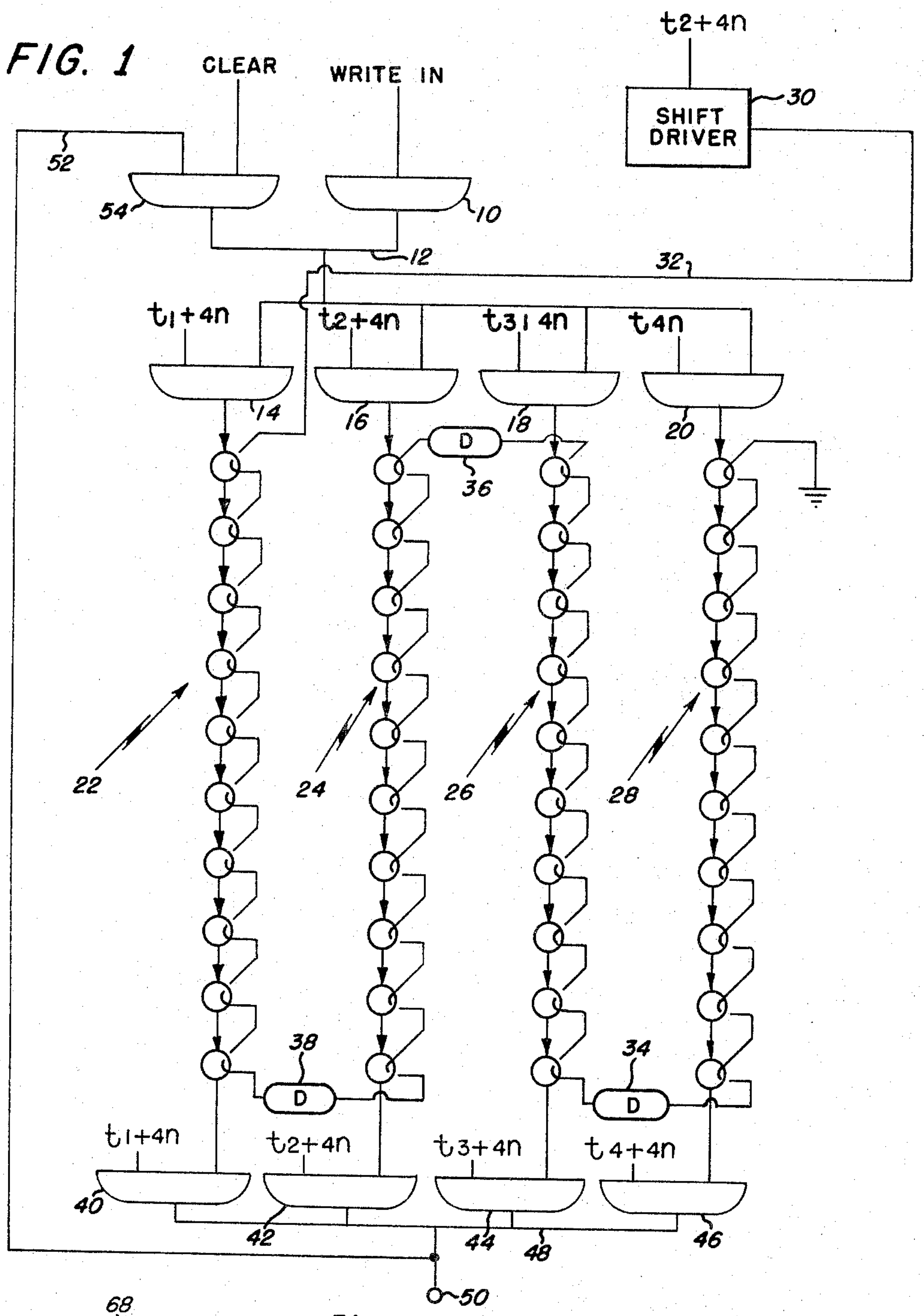

This application is a continuation of an application for Electrical Apparatus by the same inventor, Ser. No. 2,700, now abandoned, filed Jan. 15, 1960.

A general object of the present invention is to provide new and improved digital data storage and transfer circuitry. More specifically, the present invention is concerned with a new and improved digital data storage and transfer circuit which is characterized by its ability to handle large amounts of digital data utilizing relatively inexpensive circuit techniques while maintaining high data manipulation rates.

Digital data processing apparatus frequently requires apparatus for using, storing or transferring electrical pulses which represent digital data. Magnetic core devices having bistable characteristics have been found to be extremely useful in many circuits for providing the desired storage and transfer elements in such apparatus. Magnetic core circuits of this general type are discussed in an article by R. D. Kodis entitled "Application and Performance of Magnetic-Core Circuits in Computing Systems," Proceedings of the Eastern Joint Computer Conference, December 1954. As outlined in the Kodis article, magnetic core circuits have many attractive features which make their use in data handling systems extremely useful. While magnetic cores have many advantages, a shortcoming of such cores when used in some types of circuitry is that their switching speeds are relatively slow and, consequently, the amount of data that can be handled per unit of time is somewhat limited.

It is also common practice in the art of data processing systems to use electronic circuitry incorporating vacuum tubes and transistors in various circuit combinations for implementing flip-flops, shift registers and the like. Electronic circuits of this type have a distinct advantage over magnetic core circuitry for the reason that they are capable of operating at relatively high speeds so that circuitry of this type can handle large quantities of digital data per unit of time by comparison with the equivalent circuitry implemented with magnetic core devices. One of the disadvantages of these electronic type of circuits employing vacuum tubes and transistors is that they are relatively expensive to implement and the number of active elements required in the circuitry is such that the circuit reliability may be restricted.

In accordance with the teachings of the present invention, applicant has provided circuitry which can take advantage of the ideal characteristics of both magnetic core circuitry and high-speed electronic circuitry such that the resultant circuit can operate at high speeds and yet retain a maximum reliability with minimum cost.

It is therefore a further more specific object of the present invention to provide a new and improved data processing circuit which combines the ideal characteristics of high-speed electronic circuitry with the reliability and low-cost features of magnetic core circuitry.

In order to take advantage of the good characteristics of magnetic core circuits, the present invention utilizes electronic circuit means for selectively sequencing a series of magnetic core registers such that data coming into the circuit can be divided between a plurality of magnetic core registers. Once the data has been appropriately sequenced into the plurality of magnetic core registers, it is possible to utilize these registers for storing an optimum amount of data after which a suitable electronic means may again be provided for combining the outputs to duplicate or recreate the data at the input. The foregoing techniques may be applied both to transfer circuits and serial storage registers.

It is therefore a still further more specific object of the invention to provide a new and improved digital data manipulating circuit utilizing electronic circuit means for selectively sequencing digtal data into a plurality of magnetic core registers.

A further more specific object of the invention is to provide a new and improved data manipulating circuit utilizing shift registers which are operating effectively simultaneously to transfer data to an output combining circuit where the data coming in from the registers may be combined on a time-shared or sequenced basis.

The foregoing objects and features of novelty which characterize the invention, as well as other objects of the invention, are pointed out with particularity in the claims annexed to and forming a part of the present specification. For a better understanding of the inventon, its advantages and specific objects attained with its use, reference should be had to the accompanying drawings and descriptive matter in which there is illustrated and described a preferred embodiment of the invention.

Figure 2:
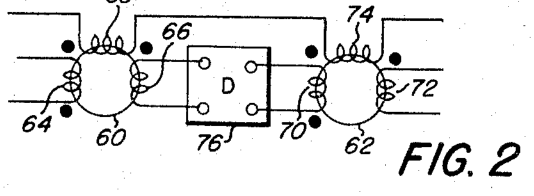

Of the drawings:

FIGURE 1 is a diagrammatic showing of a preferred embodiment of the invention; and FIGURE 2 is a diagrammatic illustration of a typical magnetic core register.

Referring first to FIGURE 1, the numeral 10 identifies an input circuit for the present invention which is adapted to receive signals from a "write-in" signal source in serial form. The circuit 10 may well take the form of a gating circuit, such as illustrated in an article entitled "Basic Gating Package for Computing Operations," by F. R. Dean, Electronic Equipment, February 1956. The circuit 10 incorporates an output amplifier which is connected to a suitable buffer line 12, the output of which is then coupled to a further plurality of gating packages 14, 16, 18 and 20. The gating packages have, in addition to the output from the buffer line 12, timing signal inputs which are adapted to open the gating circuits in accordance with a predetermined time sequence which is related to the timing of the input pulses received from the buffer line 12. The timing signals may be derived from a suitable timing source, not shown, which is also adapted to supply suitable clock signals for the circuitry in a manner well known in the art.

The output of the gating package 14 is coupled to a serial magnetic core shift register indicated generally at 22, which will be seen to comprise a series of ten magnetic core devices connected in serial fashion for data storage and transfer purposes. The gating package 16 is connected to a magnetic core shift register 24, while the gating package 18 is connected to a magnetic core register 26. The gating package 20 is coupled to a magnetic core register 28.

The magnetic core shift registers 22, 24, 26 and 28 have associated therewith a suitable shift driver 30 which supplies a shift signal or driving signal by way of the driving line 32, which is connected in series with shift windings wound on each of the magnetic core devices in each of the registers 22, 24, 26 and 28. Connected in series with the shift line 32 between each of the registers is a delay line, such as the delay line 34, line 36 and line 38. These delay lines provide the necessary phasing required in the circuit operation.

A suitable data combining circuit is provided in the outputs of the registers 22, 24, 26 and 28 by way of a plurality of gating circuits 40, 42, 44 and 46. These gating circuits are all connected together on a common output buffer line 48, which in turn leads to an output terminal 50. In addition, the buffer line 48 is coupled to a recirculation line 52, which leads to a recirculation gate 54, the latter having a further input from a "clear" signal source.

Before considering the operation of the circuitry illustrated in FIGURE 1, reference should be made to FIGURE 2 wherein the basic circuitry for the magnetic shift register used in the circuit of FIGURE 1 is illustrated. Each of the registers comprises a plurality of bistable magnetic cores such as the cores 60 and 62. The core 60 has an input winding 64, an output winding 66, and a shift winding 68. The core 62 has an input winding 70, an output winding 72, and a shift winding 74. Coupling the output winding 66 to the core 60 to the input winding 70 of the core 62 is a suitable delay line coupling link 76. The operation of this type of circuitry is discussed in the aforementioned article of R. D. Kodis. However, for purposes of consideration of the present invention, it should be noted that if a particular signal pulse representing, for example, a "one" is read into the input core 60 by way of the input winding 64, the core 60 will assume a predetermined bistable state. The application of a shift signal to the shift winding 68 will reset the core 60 and, in the course of the resetting operation, a signal will be induced in the output winding 66 which will be coupled into the delay line or coupling link 76 and then applied to the input winding 70 in the core 62 to set the latter. The application of the subsequent shift signal will reset the core 62 and once again the pulse read into the core 62 will be read out by way of the output winding 72 for transfer to a further utilization circuit which may either be a gating circuit such as the gating circuit 40 or a further magnetic core.

Referring next to the operation of FIGURE 1, it is assumed that data to be written into the circuit is derived by way of the "write-in" signal terminal and takes the form of a train of serial pulses arranged to define a predetermined code representing digital data. The occurrence of the serial pulses is presumed to occur at a selected clock time or in a synchronous manner such that the pulses will appear to have a uniform time sequence on the buffer line 12 on the output of the gating circuit 10. The signals appearing on the line 12 will be applied to all of the gating circuits 14, 16, 18 and 20. Inasmuch as there are four gating circuits illustrated in the inputs to the register lines, the timing signals on the input of these gating circuits are arranged in combinations of four such that the timing signals will open the gates in a repetitive time sequence with a complete cycle occurring every four pulse periods. Thus, the gating circuit 14 is conditioned to be opened at time $t1$, the designation $t1+4n$ in the drawing indicating the arrival of a pulse every four pulse periods thereafter. Similarly, the gating circuit 16 is conditioned to be opened every four pulse periods starting with time $t2$, i.e. $t2+4n$, the gating circuit 18 is conditioned to be opened at times $t3+4n$, and the gating circuit 20 is conditioned to be opened at times $t4+4n$. Whenever a timing signal occurs at the time that a digital input signal occurs, a signal will be written into the first magnetic core device of the registers connected to the associated gating circuit which has been opened.

It is assumed that the first four input serial pulses applied to the "write-in" line and passing through the gate circuit 10 take the form of a 1010. It is further assumed that at time $t1$, the first pulse of this series will pass the gating circuit 14 by virtue of the fact that only this gate receives a timing signal at the time. Since this first pulse is a "one," a "one" will be written into the first core of the register 22. At time $t2$, the next pulse will arrive at the gating circuits with a timing signal being applied to gate 16 only. Since this pulse is assumed to be a "zero," nothing will be passed through the gating circuit 16 and nothing will be written into the first core of the register 24. The third pulse in the series will be applied to the gating circuit 18 at time $t3$ simultaneously with a timing pulse and, since this third pulse is assumed to be a "one," this gating circuit will open and a "one" will be written into the first core of the register 26. The gate 20 will be conditioned to be operative at time $t4$. Inasmuch as the fourth pulse is assumed to be a "zero," the gating circuit 20 will not be opened and nothing will be written in the first core of the register 28.

With the shift driver 30 receiving an input timing signal $t4n$, the shift driver 30 will produce corresponding shift pulses on line 32, which will be applied to the shift windings on each of the cores making up the register 22. The timing signal $t4n$ represents a cyclic timing with a cycle time of four pulse periods. For the purposes of illustration, but without so limiting the invention, it will be assumed that these pulses are so applied that, combined with the inherent delay of the shift driver 30, the output of the latter may be represented by the expression $t4+4n$, i.e. one shift pulse will occur every four pulse periods starting at time $t4$. If it is assumed that the gating circuit 14 has a transit time of one pulse period, the first core on the register 22 will have an input set pulse applied thereto at time $t2$ to set the core. With the shift driver having an output signal occurring at time $t4$ thereafter, the first core in the series will be reset so that the signal previously read into it at time $t2$ is shifted into the next core in the series at time $t4$. The transit time of the gating circuit 16 is also assumed to be one pulse period so that a set pulse, if any, is applied to its first core of the register 24 at time $t3$. Assuming a single pulse period delay in the delay line 38, the shift pulse applied to the cores in the register 24 will occur at time $t1$, i.e. one pulse period after $t4$. The shift pulse is thus appropriately timed to shift the data signal arriving at the previous time $t3$ by way of the gating circuit 16. In the present example, where the second digit is "zero," the first core of the register 24 remains in its reset state so that a "zero" output signal is shifted to the next core of the register. Similarly, a data pulse arrives at the first core of the register 26 at time $t4$ due to a transit time of one pulse period of the gate 18. The delay of the shift pulse occasioned by the delay circuit 36 will result in the shifting of the cores of the register 26 at the subsequent time $t2$, hereby resetting the first register core. In the register 28, the input signal arrives at the first one at time $t1$ due to the transit time of the gate 20. The shift signal will be delayed a further pulse period by the delay line 34, such that these cores will be shifted at time $t3$, i.e. two pulse periods after the time at which a data signal will be gated through the gating circuit 20.

The sequential commutating or sequencing of the data into the registers 22, 24, 26 and 28 will continue as long as data is applied and the shift driver is operating. As the data reaches the ends of the registers 22, 24, 26 and 28, the gating circuits 40, 42, 44 and 46 will be opened in that time sequence by way of the clock or timing signals so that the data may be read out onto the buffer line in the appropriate time sequence and then fed to an appropriate utilization circuit by way of output terminal 50 or recirculated back to the input by way of the feedback line 52 and the recirculation gate 54.

Magnetic core circuit output signals are characteristically relatively broad by comparison with the signals normally encountered in an electronic circuit. The effects of a broad signal are eliminated by the output gating circuits by way of the timing pulses. Consequently, the output utilization circuitry associated with the output terminal 50 will see an output signal equivalent to the high-speed signals appliesd to the inputs of core circuits.

It will be readily apparent that the concepts presented in the present circuitry are adapted for extension beyond the core registers incorporated in FIGURE 1. With an increase in the number of registers, it becomes apparent that the sequencing or commutating required must be appropriately related to the number of registers utilized. This occurs both at the input and at the output. Further, the invention may be used with other types of delay storage in the registers.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure Letters Patent is:

1. A digital data transfer circuit comprising a single data input adapted to receive serial input data, a first plurality of digital data gating circuits each having an input connected to said data input, timing sequencing means connected to said gating circuits to selectively sequence the data from said input through said gating means, a plurality of serial shift registers connected one each to the outputs of each of said gating circuits, a shift signal source connected to each of said registers to shift the data therein, said shift signal source shifting each of said registers in a selected time sequence determined by said timing sequencing means, and data combining means comprising a second plurality of digital data gating circuits connected to the output of said registers for sequentially deriving serial output data from the latter in accordance with said timing sequencing means.

2. A transfer circuit as defined in claim 1 wherein said shift registers comprise a plurality of magnetic core devices coupled by signal transfer means.

3. A transfer circuit as defined in claim 2 wherein said magnetic core devices have shift windings thereon, means connecting said shift windings in series to said shift signal source, and delay means connected in series with said series connecting means between the core devices forming each of said registers.

No references cited.

BERNARD KONICK, *Primary Examiner.*

P. SPERBER, *Assistant Examiner.*